POTATO CELLS
(POTATO GRANULES)

1A

CROSS SECTION OF
POTATO AGGLOMERATE

1B

CROSS SECTION OF A
CLUSTER OF AGGLOMERATES

1C

United States Patent Office 3,809,758
Patented May 7, 1974

3,809,758
CLUSTERS OF DEHYDRATED POTATO
AGGLOMERATES
James J. Mathias and Robert L. Holland, Blackfoot,
Idaho, assignors to American Potato Company, San
Francisco, Calif.
Filed Nov. 10, 1971, Ser. No. 197,362
Int. Cl. A23b 7/03; A23l 1/06
U.S. Cl. 426—285  7 Claims

ABSTRACT OF THE DISCLOSURE

A fluidized bed of dehydrated potato agglomerates, having been screened to pass a seven mesh screen and to be retained on a 40 mesh screen with a bulk density of about 0.4–0.5 g./ml., is contacted with an aqueous binding solution containing milk solids to form clusters thereof. Said clusters are then dried to a moisture content of about 7% and then screened to isolate those clusters over about an eight mesh screen with a bulk density of about 0.247 to 0.33 g./ml. The firm low density, porous clusters of the process form mealy mashed potatoes when wetted with 4.5 parts by weight of hot water without mixing or by merely mixing with a fork.

BACKGROUND OF THE INVENTION

Field of the invention

The invention relates to the controlled formation of clusters of previously agglomerated dehydrated potato granules in the presence of additives in a fluidizing bed by the addition of a binding liquid and separating and drying the large clusters.

Description of the prior art

U.S. Pat. No. 3,407,080 discloses a process for producing a low-density, porous dehydrated potato aggregate suitable for simple rehydration to mashed potatoes in which an aqueous foam of potato solids is added to a hot bed of fluidizing potato granules.

Copending U.S. Ser. No. 875,180 discloses a process for producing a stabilized agglomerate of dehydrated potato particles suitable for reconstituting ot mashed potatoes.

U.S. Pat. No. 3,622,355 discloses a process for producing an agglomerate of dehydrated potato particles reconstitutable to a cohesive dough suitable for shaping and french frying.

U.S. Pat. No. 3,021,224 discloses a process in which potato granules are reconstituted to a mash which is then extruded and dried as porous filaments suitable for reconstitution to mashed potatoes.

U.S. Pat. No. 3,391,003 discloses a process for atomizing a wetting agent directly into a hot fluidizing bed of fine food particles to produce an agglomerate with a density of about 0.4–0.5.

U.S. Pat. No. 3,565,636 discloses a process in which liquid is dropped or streamed onto the surface of a static bed of moistened potato granules to form agglomerates which are screened out and then dried.

Several problems have been experienced in practicing prior art processes in agglomerating potato granules. When dropping or streaming liquid on static beds, the bulk density of the resulting agglomerate is too high and/or the pieces are too fragile to withstand normal handling in distribution. Other processes require extensive equipment. The invention has solved these problems experienced in practicing prior art processes.

The prior art includes numerous dehydrated instant mashed potato products of various particle size, shape, and density. For optimum appeal to the housewife, a dehydrated potato product most suitable for reconstitution to mashed potatoes must have low density, quick and easy preparation, and must not require complex preparation equipment or techniques. Potato buds have these attributes, but the process complexity requires the production of a stable, damage-free foam. Potato granules, although reconstitutable to excellent mashed potatoes, are very high in density and require relatively complex techniques and/or equipment such as mechanical mixers to obtain optimum results.

Prior art teaches the agglomeration of many food products usually for the purpose of forming particles with easy wettability and dry flowing characteristics. Best known are the instant milk products and drink formulations. Agglomeration is usually accomplished by moistening fine particles with an aqueous solution which can contain binders if necessary to create a surface stickiness which binds several small particles and holds them as an aggregate after removal of the added water by drying. In many processes, steam supplies the necessary moisture, since heat aids the agglomeration of thermoplastic foods.

SUMMARY OF THE INVENTION

Agglomerates of undamaged potato cells are required as starting material for the process. The agglomerates must be porous and reconstitute quickly to mealy mashed potatoes. Such a product is sold currently as potato Pearls, a registered trademark of American Potato Company. In addition, they must be firm enough in structure to withstand the physical action of the steps of the invention without excessive breaking. Although the invention works satisfactorily on a wide range of agglomerate sizes, agglomerates now sold commercially with a product density of about 0.44 g./ml. and which have been screened to remove material passing a 40 mesh screen are particularly suitable. The agglomerates are fed continuously to a fluid bed dryer activated with heated air. Large single drops or a fine stream of binding liquid are added to the fluidizing bed to form clusters of agglomerates. Product is withdrawn from the fluid bed unit at roughly the same rate that agglomerates are added. The product is screened to remove the newly formed clusters after which the agglomerates which have not formed clusters are recycled as part of the feed to the fluidized dryer and the clusters are dried to about 7% moisture. The dried clusters formed have a bulk density of about 0.25 to 0.35 g./ml. for particles passing a 3 mesh screen but failing to pass an 8 mesh screen. The clusters withstand normal handling without appreciable breakage and yet are porous and easily reconstitutable in hot liquid to a lump-free mealy mash. By using agglomerates as starting material, clusters of much larger size can be produced without sacrifice of desirable rehydration or handling attributes. The density of the clusters can be controlled closely by varying the composition of the binding liquid and density of the starting agglomerates. A complete potato product—one which forms a complete mash by the addition of water alone—requires milk solids. In the invention, milk solids are preferably added to the binding liquid. It was found that the percentage of milk solids in the binding liquid has a direct relationship to the density of the clusters formed. An increase in milk solids in the binding liquid results in an increase in density of the clusters. Thus, by the process of the invention, much larger particles of closely controlled density can be produced.

The clusters of the invention satisfy the requirements for an ideal retail dehydrated mashed potato product. When about 4.5 parts by weight of hot water are added to 1 part by weight of the clusters, a uniform, nonlumpy, mealy mash forms with little or no mixing. The combination of low density and greater porosity eliminates the problems of uniform wetting, proper mixing, and lumpiness associated with potato granules unless exact techniques and complicated procedures and equipment are used.

BRIEF DESCRIPTION OF THE DRAWINGS

FIG. 1A depicts potato granules—separate intact dehydrated potato cells.

FIG. 1B depicts a potato agglomerate—a loosely bonded group of potato granules. The small white areas within the agglomerate depict air spaces resulting when separated cells are bonded into an agglomerate.

FIG. 1C depicts a potato cluster—a group of heterogeneously adhering potato agglomerates. The large white areas within the cluster are air spaces which impart low density and aid rapid and uniform rehydratability.

DESCRIPTION OF THE PREFERRED EMBODIMENT

Figure 1:
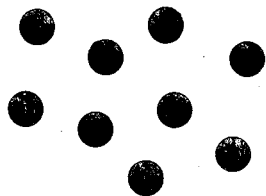
FIG. 1 depicts cross sectional views of various forms comprising discrete intact dehydrated potato cells.
Figure 1:
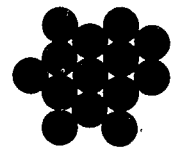
Figure 1:
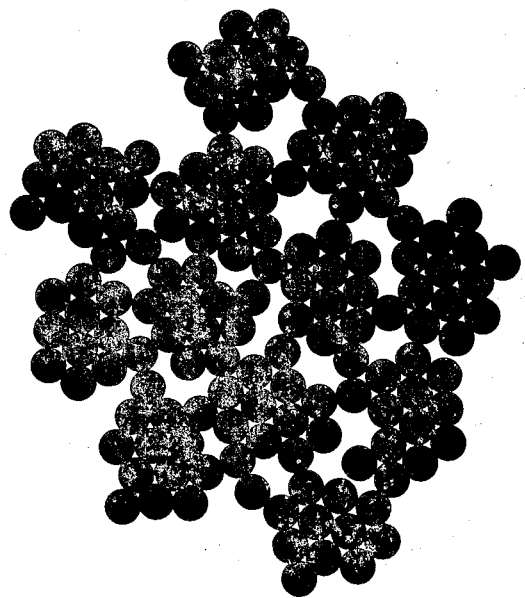

Before arriving at the preferred embodiments of the invention, many processes and variations were tested with inferior results. When commercial potato granules, which are essentially single intact dehydrated potato cells, were agglomerated by adding drops of water as was done in the prior art, densities were always too high—0.333 or above—and if not, the larger and less dense agglomerates which were formed, had unacceptable fragility. Attempts to improve this approach by adding the drops of liquid to a previously moistened bed were not successful. In both static and fluidized beds, better agglomerates resulted when the starting potato granules were in the moisture range of 7 to 8% rather than at 12 to 28%.

Many binders were tested in the binding solution used to produce clusters from agglomerates. Gums, Methocel, and sugar solutions formed clusters which were too fragile. Pregelatinized starches and sodium caseinate formed clusters of satisfactory strength, but the texture of the reconstituted product was not acceptable. Milk solids in solution not only proved to be an excellent binder, but had other unique advantages which will be explained more fully later.

The velocity of air used to fluidize the drying bed made no appreciable difference in finished cluster density or fragility in the ranges tested. Velocities of 166 feet per minute showed slightly more fragility and slightly less density than when velocities of 220 feet per minute were used. The process is not limited to the use of fluidized beds of agglomerates. The binder liquid can be added to the surface of a static layer of dry agglomerates; however, clusters produced by this embodiment, although satisfactory, are slightly higher in density and require slightly longer rehydration time.

The incorporation of vegetable oil resulted in clusters of slightly increased fragility, which, however, reconstituted to a richer flavor and smoother texture. Other useful additives, such as sulfite salts, antioxidants, flavor and color improvers had no effect on cluster formation or performance.

EXAMPLE 1

Agglomerated potatos granules screened to pass a seven mesh sceen and to be retained on a 40 mesh screen, and with a density of 0.4 to 0.45 g./ml., were used as starting material. The binding solution used comprised 9% nonfat milk solids and additives and was added to the agglomerates by flowing through #55 drill holes (0.052") in a 0.018" thick stainless steel plate. Air at a velocity of 155 to 170 feet per minute and inlet temperature of 140–150° F. was used to fluidize the bed of agglomerated potato granules.

In operation, the potato agglomerates were continuously added to the fluid bed dryer and a mixture of agglomerates and clusters were continuously removed from the dryer. This mixture was screened over an 8 mesh screen. The fraction passing the 8 mesh screen was recycled and blended with agglomerates being added to the system. The fraction failing to pass the 8 mesh screen consisted of damp clusters which were then finish dried with hot air on a perforated plate to about 7% moisture. After drying, the finished clusters were screened and the fraction passing a 3 mesh and failing to pass an 8 mesh screen had a density of about 0.29 to 0.33 g./ml. The composition of the clusters was determined as follows:

|  | Percent |
|---|---|
| Intact cooked potato cells | 92.28 |
| Nonfat milk solids | 6.50 |
| Additives | 1.22 |
|  | 100.00 |

When 4.5 parts by weight of boiling water with added butter and salt was poured over 1 part by weight of the clusters, a mealy, lump-free mashed potato was formed in approximately 10 seconds. No mixing was required.

EXAMPLE 2

The process as described in Example 1 was repeated varying the size of the holes through which the binding solution was passed. The clusters produced were screened over a 10 mesh screen. The following data were obtained:

TABLE 1

| Test number | A | B | C | D |
|---|---|---|---|---|
| Hole diameter (inches) | 0.04 | 0.052 | 0.073 | 0.1065 |
| Density of +10 clusters (g./ml.) | 0.323 | 0.323 | 0.323 | 0.323 |
| Density of −3+10 clusters (g./ml.) | 0.328 | 0.323 | 0.323 | 0.336 |
| Particle size distribution (percent): | | | | |
| +½ inch | 0 | 0 | 0 | 0 |
| +3 mesh | 0 | 0 | 8.2 | 37.0 |
| −3+4 mesh | 3.3 | 15.6 | 46.5 | 34.2 |
| −4+6 | 47.6 | 57.1 | 31.9 | 18.1 |
| −6+8 mesh | 41.0 | 23.7 | 10.7 | 7.7 |
| −8+10 mesh | 8.1 | 3.6 | 2.7 | 3.0 |
| Total | 100.0 | 100.0 | 100.0 | 100.0 |

These tests show that the density of the finished clusters is not appreciably affected in this range of droplet size; however, the largest droplet tested yielded a large percentage of product which required a breaking step to reduce the clusters to the preferred size.

EXAMPLE 3

A series of tests was conducted in which various size potato granule agglomerates were clustered as in Example 1, introducing the binding liquid comprising 5% nonfat milk solids through an 18-gauge needle and recovering dried plus 8-mesh clusters. The results are shown in the following table:

TABLE 2

| Starting product size | Initial density (g./ml.) | Cluster density (g./ml.) | Cluster strength |
|---|---|---|---|
| 1. Commercial potato granules (not agglomerated) | 0.90 | 0.377 | Good. |
| 2. −35 mesh potato agglomerates | 0.565 | 0.267 | Do. |
| 3. −28+35 mesh potato agglomerates | 0.46 | 0.256 | Do. |
| 4. −20+28 mesh potato agglomerates | 0.435 | 0.247 | Slightly fragile. |
| 5. −8+20 mesh potato agglomerates | 0.385 | 0.247 | Fragile. |

These tests show that the density of the clusters varies directly with the density of the starting agglomerate. It is also shown that very large agglomerates form clusters with reduced resistance to breakage.

EXAMPLE 4

A series of tests was run starting with agglomerates of potato granules with a bulk density of 0.4–0.45 g./ml. as in Example 1. In this series, the only variable was the percentage of milk solids in the binding solution which was introduced through a 3/32 inch ID tube. Other conditions were the same as in Example 1. The finished clusters were tested for density and rehydration properties as follows:

TABLE 3

| Percent nonfat milk solids in binding solution | Density (g./ml.) | Rehydration properties |
|---|---|---|
| 2.5 | 0.303 | Good, no lumps. |
| 5.0 | 0.318 | Do. |
| 7.5 | 0.323 | Do. |
| 10.0 | 0.340 | Do. |

This series shows not only that the use of milk solids in solution in the binding solution results in clusters with the required properties, but surprisingly, the actual bulk density of the resulting clusters, when dried, can be controlled closely by varying the concentration of milk solids in the solution. When all other variables remain unchanged, the density of the clusters can be increased by increasing the concentration of the milk solids in the binding solution and decreased by decreasing the concentration of milk solids in the binding solution. This information, coupled with the facts disclosed in Table 2, allows the density of the finished clusters to be controlled precisely by either varying the density of the starting agglomerates and/or by varying the concentration of milk in the binding solution.

Prior art processes disclose the production of agglomerates of potato cells by adding liquid to result in adherance of adjacent cells. The size of agglomerate which can be produced by this approach is restricted. Although some large, low density moist agglomerates are undoubtedly formed during prior art agglomerating steps, they apparently break apart during processing or in subsequent handling. When sufficient binders are added to produce large but sufficiently firm agglomerates to withstand such breakage, the rehydration characteristics are adversely affected and lumpy mashed potatoes result. The subject invention allows production of clusters which have both the necessary low density and structural strength coupled with satisfactory rehydration properties. In the invention, by starting the process with agglomerates of satisfactory fragility, rehydration characteristics, and structural strength, it appears that when their surfaces are wetted with a milk solution or with water in the presence of milk solids, such agglomerates have the capability of further agglomerating to form clusters of firm structure with resistance to breakage without sacrificing rehydration characteristics. Such clusters are new to the art and satisfy a need for very low density dehydrated potato product which can be reconstituted to a lump-free mashed potato with little or no mixing.

It will be obvious to one skilled in this art that the percentage of milk solids in the finished clusters can be varied to suit the individual taste. Although about 6.5% by weight milk solids is preferred, clusters with milk solids in the range of 2.5 to 10% are often desired and clusters with 1 to 15% are useful. Likewise, salt, pepper, butter or oil or other additives can be incorporated as desired preferably in the binding solution.

The word "agglomerate" as used in this disclosure means a loosely-bonded group of substantially individual cooked intact potato cells which have previously been separated and which again break apart to single cells when reconstituted. This is in contrast to groups of cells which remain bound in their original position in relation to each other such as a particle resulting from grinding, for example, dehydrated diced or sliced potato and which do not separate to single cells when reconstituted to produce a mash. The term "potato granules" refers to a commercial dehydrated potato product consisting essentially of intact single potato cells with a small percentage of small groups of cells. The term "cluster" as used in this disclosure means a product consisting of several adhered agglomerates attached heterogeneously and firmly enough to prevent breakage during normal handling, but which readily break down to individual cells upon reconstitution. This is in contrast to an agglomerate of comparable size which is relatively homogeneous in structure. By analogy, a large popcorn ball is a homogeneous agglomerate. A cluster would be a heterogeneous ball of comparable size consisting of several randomly adhering small popcorn balls with enclosed and partially enclosed relatively large void areas which allow rapid and uniform reconstitution when liquid is added. The heterogeneity of the product of this invention appears to be responsible for the improved rehydration characteristics.

What is claimed is:

1. A process for the production of clusters of agglomerates of dehydrated intact potato cells comprising the steps of:
   (a) preparing a bed of dehydrated agglomerates of substantially intact potato cells, said agglomerates having been produced from potato granules, and said agglomerates having been screened to pass a seven mesh screen and to be retained on a 40 mesh screen;
   (b) producing an aqueous binding solution which contains milk solids in the range of 2.5 to 10% by weight of said solution;
   (c) contacting said agglomerates with said solution to form clusters;
   (d) drying said clusters to a moisture content of about 7%; and
   (e) screening said dried clusters to isolate the fraction with a bulk density of about 0.247 to 0.33 grams per milliliter.

2. The process of claim 1 in which said formed clusters are isolated from said agglomerates before drying.

3. The process of claim 2 in which said isolating comprises screening said formed clusters over about an eight mesh screen.

4. The process of claim 1 in which said bed is fluidized by air.

5. The process of claim 4 in which said agglomerates have a bulk density in the range of 0.4 to 0.5 grams per milliliter.

6. The process of claim 1 in which said agglomerates are contacted by sufficient said binding solution to produce said clusters comprising when dried from 1 to 10% by weight milk solids.

7. The process of claim 5 in which said contacting step comprises flowing said binding solution through an opening in the range of 0.04 to 0.1065 inch in diameter.

References Cited

UNITED STATES PATENTS

| 3,021,224 | 2/1962 | Stagmeier | 99—207 |
| 3,063,849 | 11/1962 | Nelson | 99—207 |
| 3,085,019 | 4/1963 | Kueneman | 99—207 |
| 3,275,458 | 9/1966 | Willard | 99/207 |
| 3,396,036 | 8/1968 | Liepa | 99—207 |
| 3,407,080 | 10/1968 | Rainwater | 99—207 |
| 3,565,636 | 2/1971 | Hutchings | 99—100 P |

NORMAN YUDKOFF, Primary Examiner

M. G. MULLEN, Assistant Examiner

U.S. Cl. X.R.

426—453, 456